(12) United States Patent
Green

(10) Patent No.: US 12,344,220 B2
(45) Date of Patent: Jul. 1, 2025

(54) SELECTIVE BRAKING FOR STEERING LOADS

(71) Applicant: Robert Bosch GmbH, Stuttgart (DE)

(72) Inventor: Richard Scott Green, Commerce Township, MI (US)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 18/447,137

(22) Filed: Aug. 9, 2023

(65) Prior Publication Data

US 2025/0050852 A1 Feb. 13, 2025

(51) Int. Cl.
| | |
|---|---|
| *B60T 8/26* | (2006.01) |
| *B60T 8/32* | (2006.01) |
| *B60W 10/18* | (2012.01) |
| *B60W 40/105* | (2012.01) |
| *B60W 40/107* | (2012.01) |
| *B60W 50/10* | (2012.01) |

(52) U.S. Cl.
CPC .............. *B60T 8/26* (2013.01); *B60T 8/3205* (2013.01); *B60W 10/18* (2013.01); *B60W 40/105* (2013.01); *B60W 40/107* (2013.01); *B60W 50/10* (2013.01); *B60W 2510/20* (2013.01); *B60W 2520/105* (2013.01); *B60W 2540/18* (2013.01)

(58) Field of Classification Search
CPC ........ B60T 8/26; B60T 8/3205; B60W 10/18; B60W 40/105; B60W 40/107; B60W 50/10; B60W 2510/20; B60W 2520/105; B60W 2540/18
See application file for complete search history.

(56) References Cited

U.S. PATENT DOCUMENTS

| | | | |
|---|---|---|---|
| 7,165,644 B2 | 1/2007 | Offerle et al. | |
| 9,925,988 B1 * | 3/2018 | Zwicky | B60W 10/20 |
| 10,046,743 B2 * | 8/2018 | Jonasson | B62D 9/005 |
| 11,472,383 B2 | 10/2022 | Sakaguchi et al. | |
| 11,554,762 B2 | 1/2023 | Rothhämel et al. | |
| 2023/0035650 A1 | 2/2023 | Hecker et al. | |
| 2024/0140399 A1 * | 5/2024 | Noma | B62D 6/003 |

* cited by examiner

*Primary Examiner* — Xiao En Mo
(74) *Attorney, Agent, or Firm* — Michael Best & Friedrich LLP

(57) ABSTRACT

Examples provide a system for a vehicle. The system includes a set of sensors and an electronic processor in communication with the set of sensors and a set of vehicle brakes. The electronic processor receives a braking request indicative of a first braking force, determines a speed of the vehicle, determines a rack force of the vehicle, and determines whether a set of selective braking conditions are met. The selective braking conditions include a determination that the speed of the vehicle is less than a vehicle speed threshold and a determination that the rack force is greater than a rack force threshold. When the set of selective braking conditions are met, the electronic processor selectively controls a first brake according to the first braking force and a second brake according to a second braking force. The second braking force is less than the first braking force.

18 Claims, 16 Drawing Sheets

SELECTIVE BRAKING FOR STEERING LOADS

BACKGROUND

Embodiments, examples, and aspects described herein relate to, among other things, a system and method for selective braking to reduce steering loads.

SUMMARY

When a vehicle is steered, the steering rack force is unevenly distributed on the tie rods of the inner curve of travel and the outer curve of travel, respectively, due to vehicle kinematics, Ackermann steering geometry, and other factors. This uneven distribution causes a load increase on the tie rods near the end of curve travel. The scrub radius and mechanical trail of the vehicle also affect the rack force by forcing the contact patch to translate around the kingpin axis. Application of the vehicle brakes during vehicle steering, particularly near the end of steering travel, causes a substantial increase in the steering load by dragging, rather than rolling, the contact patch. These increased loads require vehicle systems to be sized larger, and over time, these loads cause more wear to the components of the vehicle, such as the tires, tie rods and steering gear.

Thus, there is a need for reduction in tie rod loads at or near vehicle standstill. One example provides a system for a vehicle. The system includes a set of sensors; an electronic processor in communication with the set of sensors and a set of vehicle brakes, the electronic processor configured to: receive a braking request from a user via a brake pedal, the braking request indicative of a first braking force, determine, using the set of sensors, a speed of the vehicle, determine, using the set of sensors, a rack force of the vehicle, determine, using the set of sensors, a steering angle of the vehicle, and determine whether a set of selective braking conditions are met. The set of selective braking conditions comprise a determination that the speed of the vehicle is less than a vehicle speed threshold, a determination that the rack force is greater than a rack force threshold, and a determination that the steering angle is greater than a steering angle threshold. In response to determining that the set of selective braking conditions are met, the electronic processor selectively controls each brake included in the set of vehicle brakes by controlling a first brake included in the set of vehicle brakes according to the first braking force, and controlling a second brake included in the set of vehicle brakes according to a second braking force, the second braking force being less than the first braking force.

In some aspects, the first brake is a rear brake of the vehicle, and the second brake is a front brake of the vehicle.

In some aspects, the second braking force is zero braking force.

In some aspects, the second braking force is inversely related to the steering angle of the vehicle.

In some aspects, the first brake and the second brake are arranged on the same axle of the vehicle, the second brake is arranged on a first side of the axle, the first side corresponding to a steered direction of the vehicle, and the first brake is arranged on a second side of axle opposite the first side.

In some aspects, the second braking force is inversely related to an absolute value of the steering angle of the vehicle.

In some aspects, the electronic processor is further configured to determine whether the vehicle is at an incline, and the set of selective braking conditions further comprise a determination that the vehicle is not at an incline.

In some aspects, the set of sensors include an inertial measurement unit ("IMU"), the electronic processor is configured to determine, using the IMU, an acceleration of the vehicle, and determine that the vehicle is not slipping by determining that the acceleration is less than an acceleration threshold, and the set of selective braking conditions further comprise a determination that the vehicle is not slipping.

In some aspects, the electronic processor is further configured to, in response to determining that the set of selective braking conditions are not met, control the set of vehicle brakes according to the braking request.

Another example provides a method for controlling a vehicle including an electronic processor and a set of sensors. The method includes receiving a braking request from a user via a brake pedal, the braking request indicative of a first braking force; determining, using the set of sensors, a speed of the vehicle; determining, using the set of sensors, a rack force of the vehicle; determining, using the set of sensors, a steering angle of the vehicle; determining whether a set of selective braking conditions are met, the set of selective braking conditions comprising a determination that the speed of the vehicle is less than a vehicle speed threshold, a determination that the rack force is greater than a rack force threshold, and a determination that the steering angle is greater than a steering angle threshold; and, in response to determining that the set of selective braking conditions are met, selectively controlling each brake included in the set of vehicle brakes by controlling a first brake included in the set of vehicle brakes according to the first braking force, and controlling a second brake included in the set of vehicle brakes according to a second braking force, the second braking force being less than the first braking force.

In some aspects, the first brake is a rear brake of the vehicle, and the second brake is a front brake of the vehicle.

In some aspects, the second braking force is zero braking force.

In some aspects, the second braking force is inversely related to the steering angle of the vehicle.

In some aspects, the first brake and the second brake are arranged on the same axle of the vehicle, the second brake is arranged on a first side of the axle, the first side corresponding to a steered direction of the vehicle, and the first brake is arranged on a second side of axle opposite the first side.

In some aspects, the second braking force is inversely related to an absolute value of the steering angle of the vehicle.

In some aspects, the method further includes determining, using the set of vehicle sensors, whether the vehicle is at an incline, wherein the set of selective braking conditions further comprise a determination that the vehicle is not at an incline.

In some aspects, the method further includes determining, using an inertial measurement unit included in the set of sensors, an acceleration of the vehicle, and determining that the vehicle is not slipping by determining that the acceleration is less than an acceleration threshold, wherein the set of selective braking conditions further comprise a determination that the vehicle is not slipping In some aspects, the method further includes in response to determining that the set of selective braking conditions are not met, controlling the set of vehicle brakes according to the braking request.

DETAILED DESCRIPTION

Figure 1:
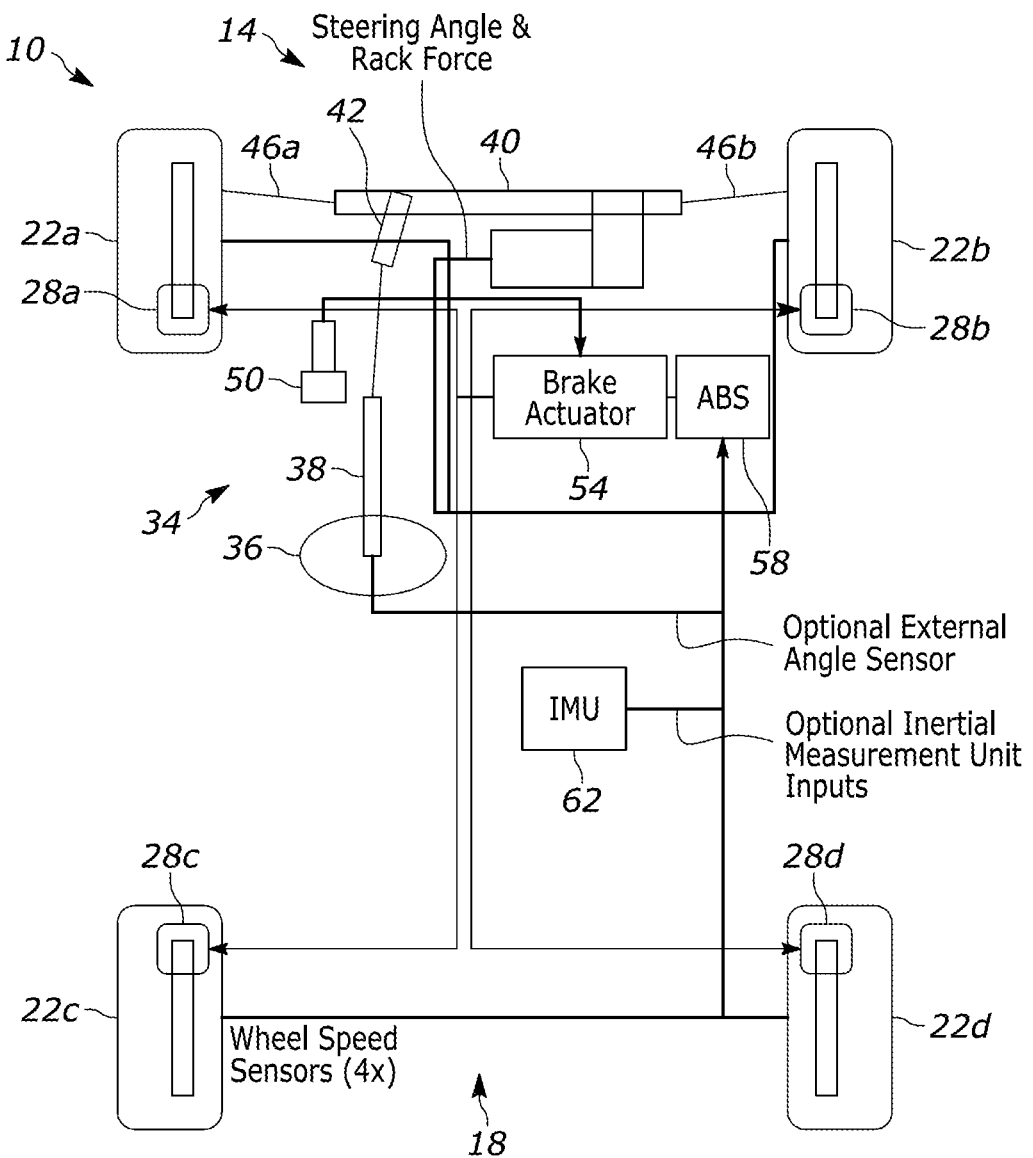
FIG. 1 schematically illustrates a vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 illustrates a vehicle 10, according to some aspects. The vehicle 10 includes a first axle assembly 14 (e.g., front axle assembly 14) and a second axle assembly 18 (e.g., rear axle assembly 18). The vehicle 10 may be a front steer vehicle 10, a rear steer vehicle 10, or a front and rear steer vehicle 10. The vehicle 10 also includes a front left wheel 22a arranged on a first side (e.g., left side) of the front axle assembly 14, a front right wheel 22b arranged on the opposite side (e.g., right side) of the front axle assembly 14, a rear left wheel 22c arranged on a first side (e.g., left side) of the rear axle assembly 18, and a rear right wheel 22d arranged on the opposite side (e.g., right side) of the rear axle assembly 18. The vehicle 10 further includes a set of vehicle brakes 28, including a front left brake 28a, a front right brake 28b, a rear left brake 28c, and rear right brake 28d, respectively coupled to the front left wheel 22a, the front right wheel 22b, the rear left wheel 22c, and the rear right wheel 22d for braking the respective vehicle wheel.

The vehicle 10 includes a steering assembly 34 including a steering wheel 36, a steering shaft 38, a steering rack 40 and pinion 42, a left tie rod connected between the steering rack 40 and the front left wheel 22a, and a right tie rod 46b connected between the steering rack 40 and the front right wheel 22b. The vehicle 10 further includes a brake pedal 50 electrically connected to a brake actuator 54 for controlling each of the vehicle brakes 28. The vehicle 10 may also include ABS 58 and insertional measurement unit ("IMU") 62.

Figure 2:
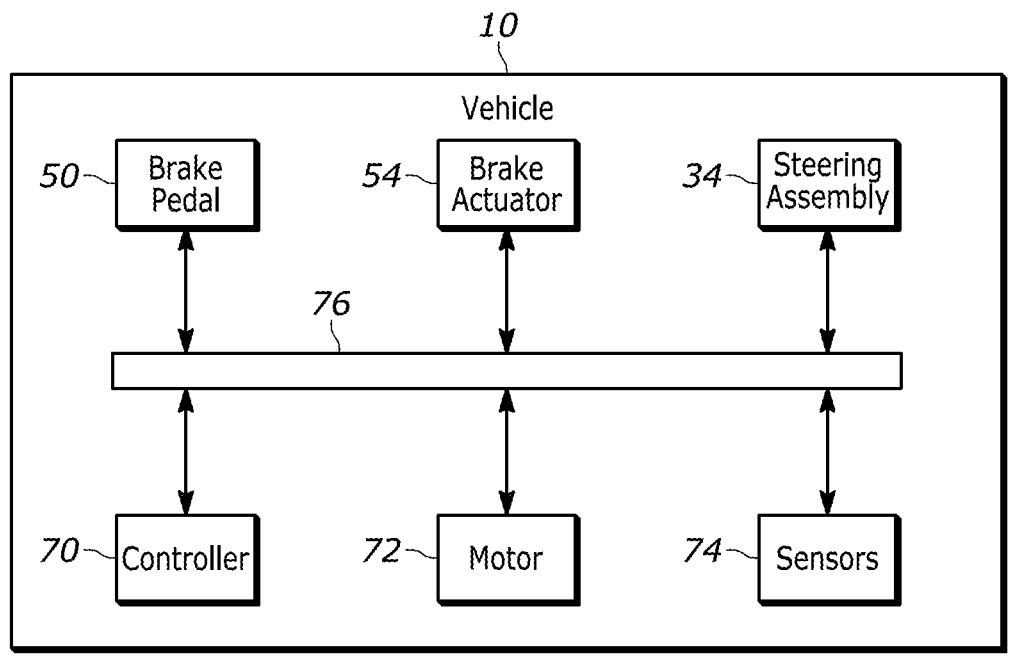
FIG. 2 schematically illustrates a vehicle, according to some aspects.

The vehicle 10 may include more or fewer components than those illustrated in FIG. 1. For example, FIG. 2 schematically illustrates the vehicle 10, according to another example. As illustrated in FIG. 2, the vehicle 10 further includes an electronic controller 70, a power steering motor 72, and a plurality of sensors 74 installed on the vehicle 10. The components of the vehicle 10, along with other various modules and components are electrically and communicatively coupled to each other via direct connections or by or through one or more control or data buses (for example, the bus 76), which enable communication therebetween. The use of control and data buses for the interconnection between, and communication among, the various modules and components would be known to a person skilled in the art in view of the invention described herein. In some instances, the bus 76 is a controller area network (CAN) bus. In some instances, the bus 76 is an automotive Ethernet, a FlexRay™ communications bus, or another suitable bus. In some instances, some or all of the components of the vehicle 10 may be communicatively coupled using suitable wireless modalities (for example, Bluetooth™ or near field communication connections).

The controller 70 (described in greater detail below with respect to FIG. 3) communicates with various vehicle control systems and components (e.g., the brake pedal 50, the brake actuator 54, the steering assembly 34, the motor 72, the sensors 74, and/or the like). For example, the controller 70 may receive sensor data from the sensors 74 and determine control commands for the vehicle 10. The controller 70 transmits the control commands to other vehicle components and control systems to operate or assist in operating the vehicle 10 (for example, by generating braking signals, acceleration signals, steering signals). In some instances, the controller 70 is part of one or more vehicle controllers that implement autonomous or partially autonomous control of the vehicle 10. The controller 70 may be located in a suitable location or locations in the vehicle 10. The controller 70 may distributed among multiple controllers 70.

The sensors 74 measure one or more attributes of the vehicle 10 and the environment around the vehicle 10 and communicate information regarding those attributes to the other components of the vehicle 10 using, for example, messages transmitted on the bus 76. The sensors 74 may include, for example, sensors that detect accelerator pedal position and brake pedal position, wheel speed sensors, steering angle sensors, vehicle speed sensors, yaw, pitch, and roll sensors, Hall effect sensors, force sensors, torque sensors, rotor position sensors, acceleration sensors (e.g., forward/reverse acceleration sensors, lateral acceleration sensors, Z-axis acceleration sensors, etc.), image sensors (e.g., cameras), and vehicle proximity sensors (for example, ultrasonic). In some instances, the sensors 74 are similar to sensor sets used in an electronic stability control (ESC) system and similar vehicle control systems.

Figure 3:
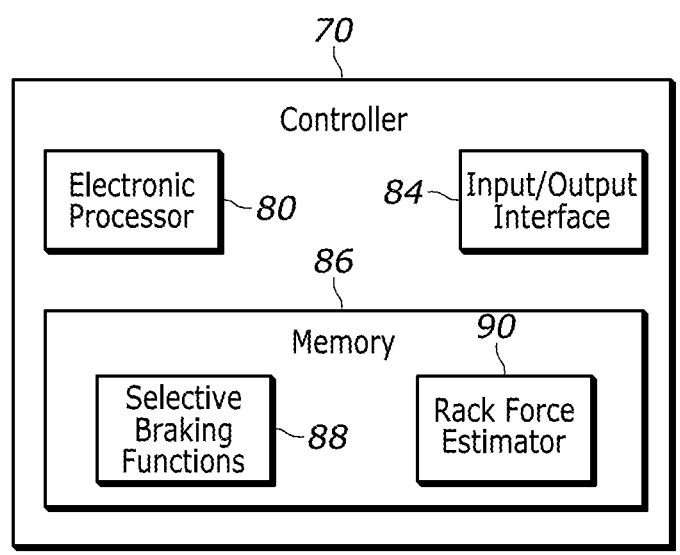
FIG. 3 schematically illustrates a controller of a vehicle, according to some aspects.

FIG. 3 illustrates an example of the controller 70, which includes an electronic processor 80 (for example, a microprocessor, application specific integrated circuit, etc.), an input/output interface 84, and a memory 86. The memory 86 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 80 is coupled to the input/output interface 84 and the memory 86. The electronic processor 80 sends and receives information (for example, from the memory 86 and/or the input/output interface 84) and processes the information by executing one or more software instructions or modules, capable of being stored in the memory 86, or another non-transitory computer readable medium. The software can include firmware, one or more applications, program data, filters, rules, one or more program modules, and other executable instructions.

The electronic processor 80 is configured to retrieve from the memory 86 and execute, among other things, software for performing the methods as described herein. In the example illustrated, the memory 86 stores, among other things, selective braking functions 88 and a rack force estimator 90 used for performing selective braking. The input/output interface 84 transmits and receives information from devices external to the controller 70 (for example, components of the vehicle 10 via the bus 76). It should be understood that the controller 70 may include additional components than those illustrated in FIG. 3 and in various configurations. For example, in some examples, the controller 70 includes multiple electronic processors 80, multiple input/output interfaces 84, multiple memory modules 86, or a combination thereof.

Figure 4A:
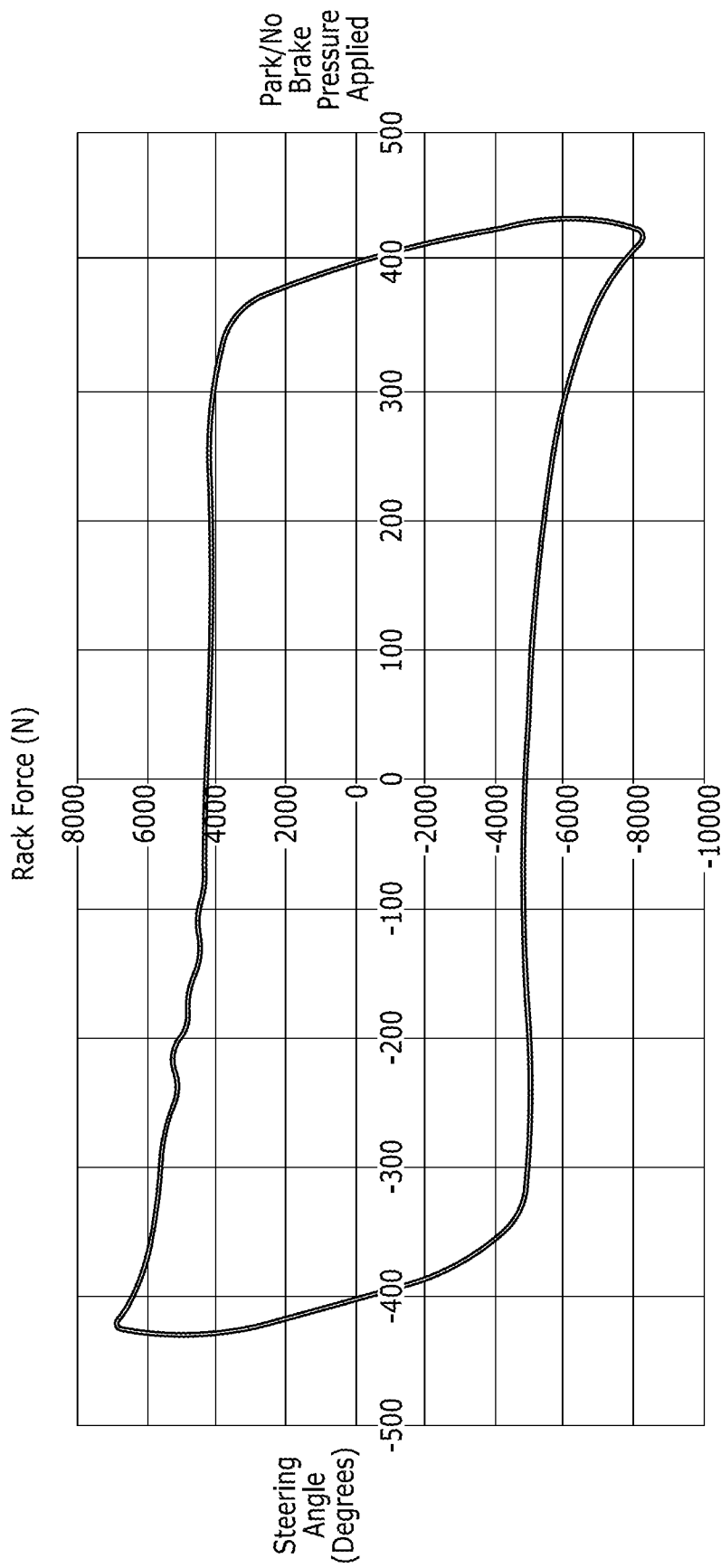
FIG. 4A illustrates an example graph comparing steering angle values with steering rack force values when vehicle brakes are not applied at standstill, according to some aspects.
Figure 4B:
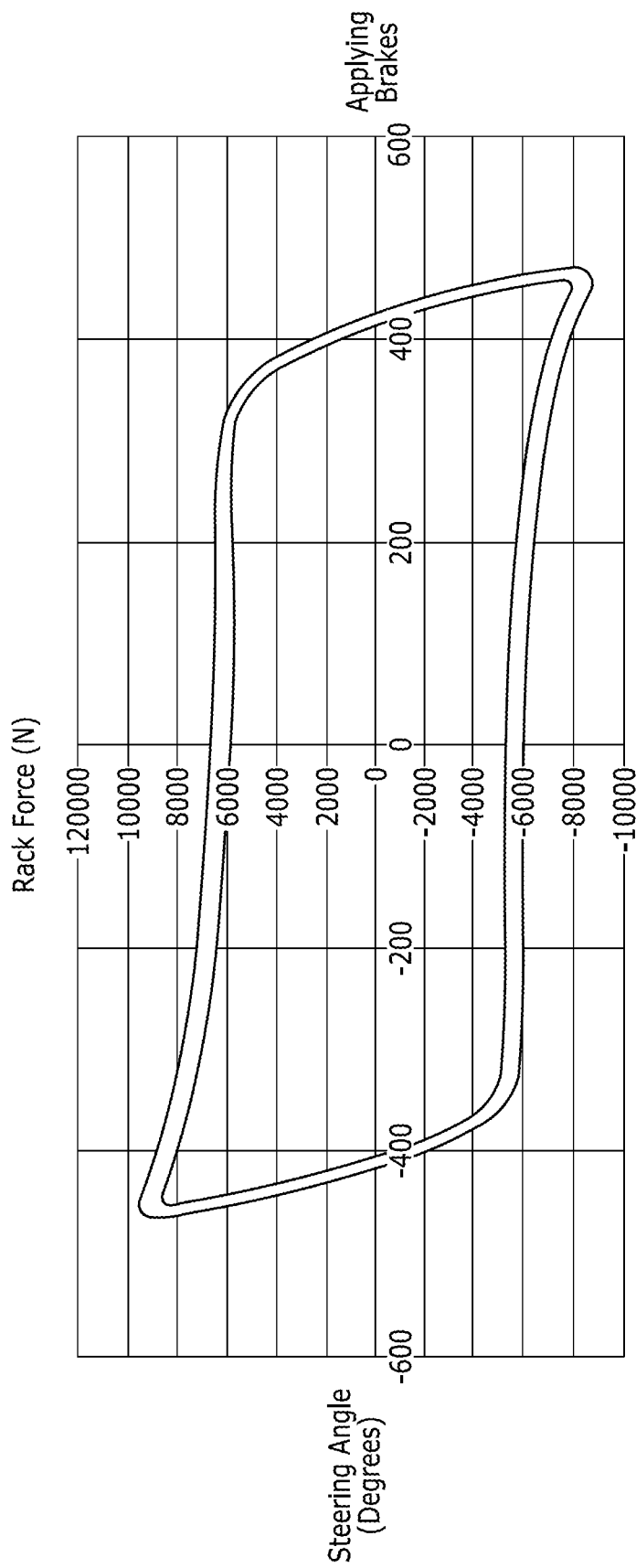
FIG. 4B illustrates an example graph comparing steering angle values with steering rack force values when vehicle brakes are applied at standstill, according to some aspects.

FIG. 4A illustrates an example graph comparing steering angle values (e.g., between an example maximum negative angle and an example maximum positive angle) of the vehicle 10 with resulting steering rack force values when the vehicle brakes 28 are not applied at standstill. As illustrated in FIG. 4A, greater absolute values of steering angle result in greater absolute values of steering rack force. As described above, application of the vehicle brakes as the vehicle 10 is steered left or right, in particular when the vehicle 10 is stationary, may cause stress and wear to the components of the steering assembly 34, such as the vehicle tie rods 46, steering rack 40, and/or the tires of the vehicle. For example, FIG. 4B illustrates an example graph comparing steering angle values of the vehicle 10 with resulting steering rack force values when the vehicle brakes 28 are applied standstill. As shown in the example of FIG. 4B, the absolute value of the resulting steering rack force increases by approximately 2,000 Newtons ("N") when the brakes 28 of the vehicle 10 are applied. The increase in steering rack force, however, may be greater than 2,000 N or less than 2,000 N. It should be understood that the values illustrated in FIGS. 4A and 4B illustrate only one example set of values (e.g., example set of steering angle values and example set of rack force values), and that these values may vary according to implementation.

Figure 5:
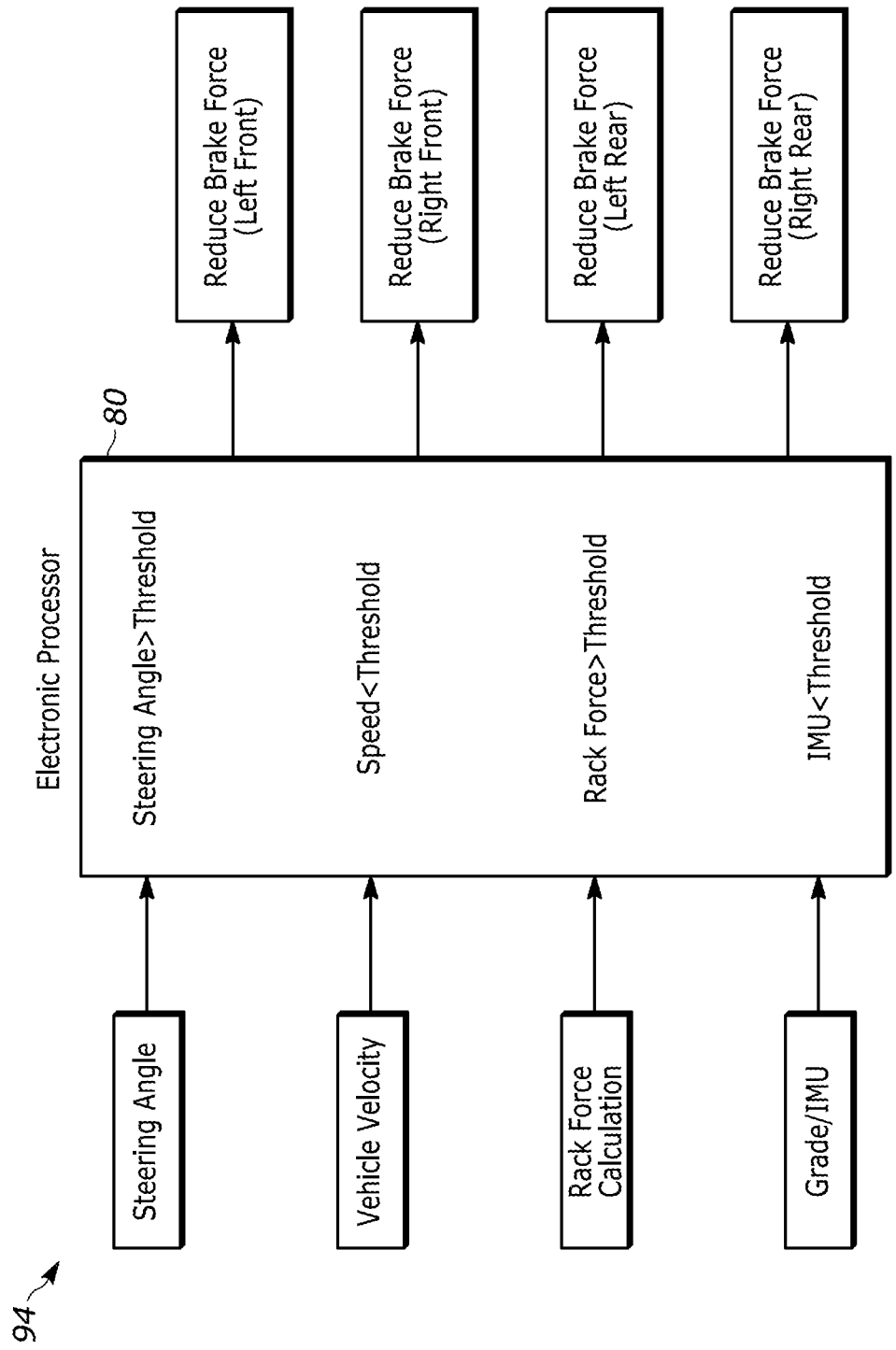
FIG. 5 illustrates a block diagram of a selective braking control for reducing loads on a steering assembly, according to some aspects.

Therefore, FIG. 5 illustrates a block diagram 94 of the selective braking control used by the electronic processor 80 in conjunction with other vehicle components (e.g., the selective braking functions 88) for reducing loads on the steering assembly 34. As illustrated in FIG. 5, the electronic processor 80 may receive a set of inputs including, for example, measured steering angle (e.g., from a steering angle sensor included the steering assembly 34), a measured vehicle velocity (e.g., from wheel speed sensors), a measured rack force (e.g., calculated using the rack force estimator 90), and, optionally, a measured value related to the acceleration of the vehicle 10 (e.g., an acceleration determined using the IMU 62). Based on the set of inputs, the electronic processor 80 determines whether to reduce a brake force that would otherwise be applied to the front left brake 28a, the front right brake 28b, the rear left brake 28c, and/or the rear right brake 28.

The electronic processor 80 reduces the brake force in a selected one or more of the vehicle brakes 28 when a set of selective braking conditions are met. The selective braking conditions include a determination that the steering angle is greater than a steering angle threshold, a determination that the vehicle speed is less than a vehicle speed threshold, a determination that the rack force is greater than a rack force threshold, and, in some instances, a determination that the IMU acceleration value is less than an IMU threshold. When all of the selective braking conditions included in the set are met, the electronic processor 80 performs selective braking of the vehicle brakes 28 by reducing a bake force in one or more of the vehicle brakes 28.

The steering angle threshold may be a predetermined steering angle value indicating that application of the brakes 28 at that steering angle may result in substantial a substantial load increase on the steering assembly. In either direction, the steering angle threshold may be, for example, 80 degrees, 90 degrees, 100 degrees, or another steering angle value.

The vehicle speed threshold is a threshold speed indicative that the vehicle 10 is at or near standstill. For example, the vehicle speed threshold may be approximately 5 kilometers per hour ("kph"), approximately 2 kph, 0 kph, or another value.

The rack force threshold may be a predetermined percentage value of the maximum rack force of the vehicle 10 (e.g., 40% of the maximum rack force, 50% of the maximum rack force, 60% of the maximum rack force, or another percentage value). Because the rack force may be indicative of the friction of the surface on which the vehicle 10 is travelling, the electronic processor 80 may use the rack force value to determine whether there is sufficient friction to perform selective braking.

The IMU threshold is a threshold value indicating that the vehicle 10 is not accelerating in any direction (e.g., slipping). The IMU threshold may be a threshold acceleration value indicating that the vehicle 10 is near stationary in a given direction. The IMU threshold may be, for example, 0.5 meters per second squared ("m/s²"), 1 m/s², 1.5 m/s², or another value.

Figure 6A:
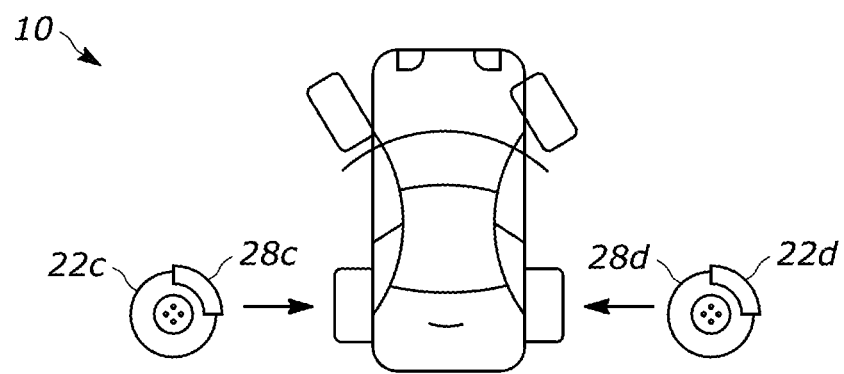
FIG. 6A illustrates a first example of selective braking depicted via a vehicle graphic, according to some aspects.
Figure 6B:
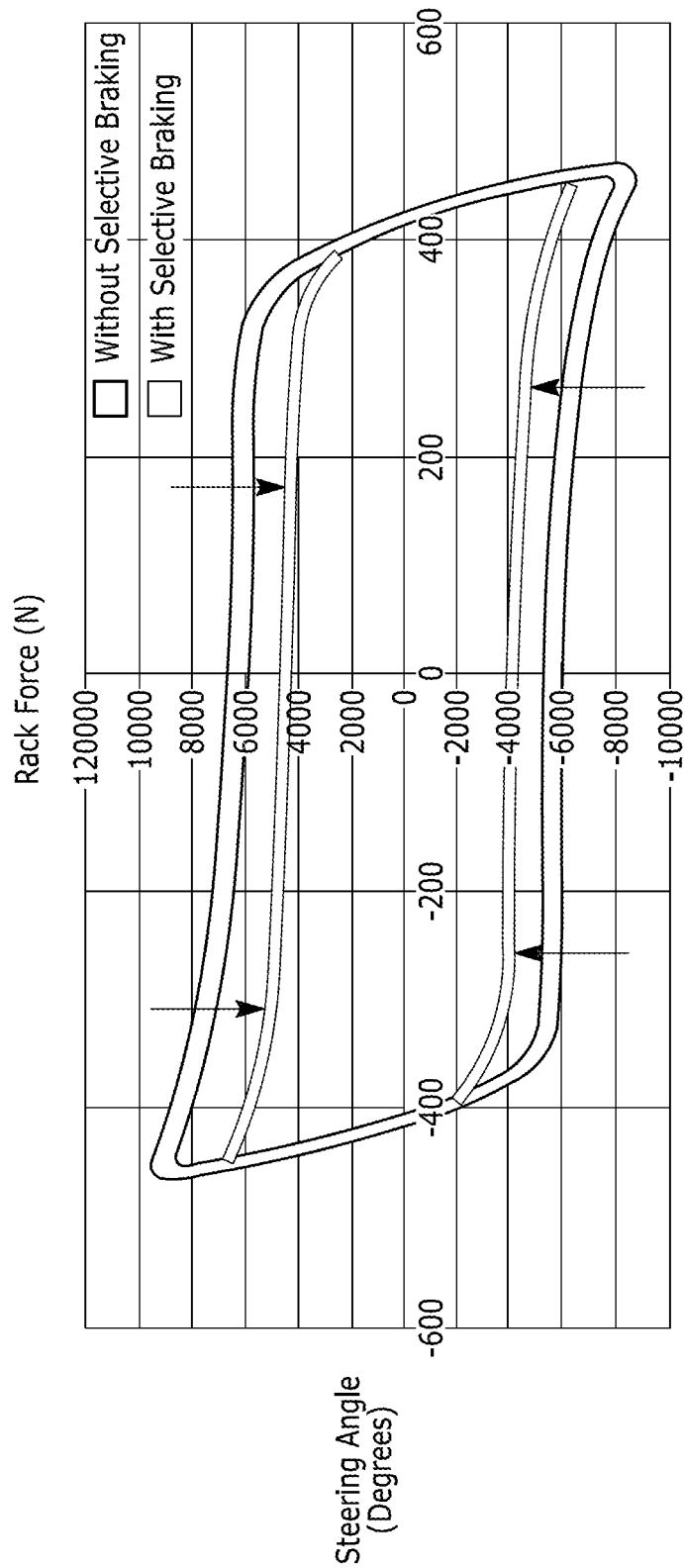
FIG. 6B illustrates a first example graph comparing the steering angle values with steering rack force values with and without selective braking, according to some aspects.

Referring now to FIG. 6A, in some instances, the electronic processor 80 performs selective braking by reducing the brake force applied at the front brakes 28a and 28b in order to reduce loads on the steering assembly. In such instances, as illustrated in FIG. 6A, brake force is applied only to the rear brakes when the selective braking conditions are met. Reduction of the brake force at the front brakes 28a and 28b may include a complete reduction of the brake force at the front brakes 28a and 28b to 0 Newtons. For example, FIG. 6B illustrates an example graph comparing the steering angle values of the vehicle 10 with resulting steering rack force values with and without selective braking by reduction of the brake force of the front brakes 28a and 28b. As illustrated in the example of FIG. 6B, the steering rack force may be reduced as all steering angles through selective braking.

Figure 6C:
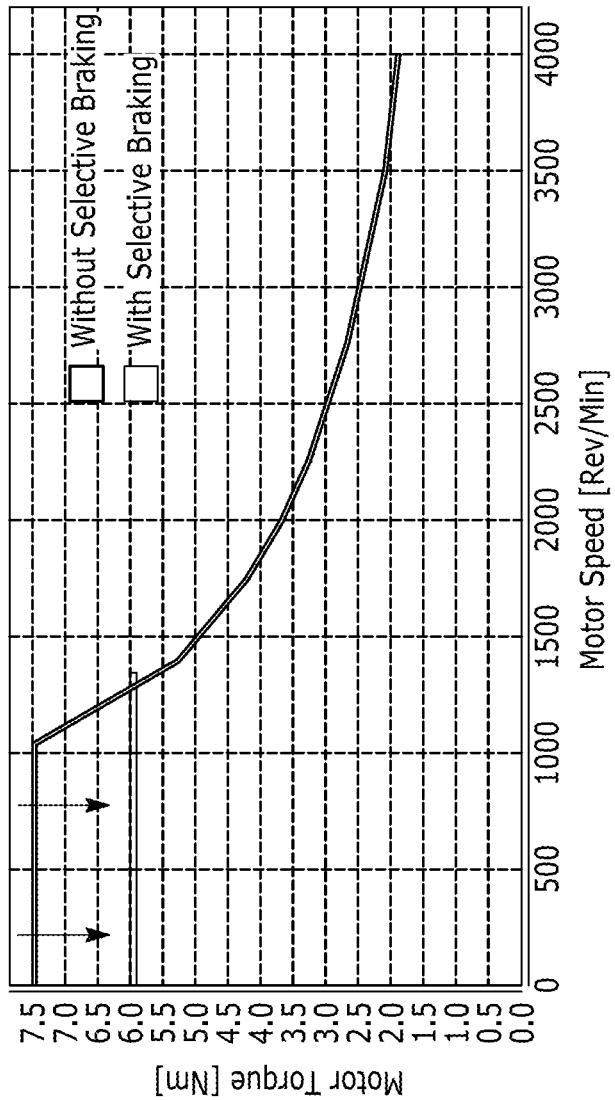
FIG. 6C illustrates a first example graph comparing motor speed values with corresponding motor torque values with and without selective braking, according to some aspects.

FIG. 6C illustrates an example graph comparing motor speed values in revolutions per minute of the motor 72 with corresponding motor torque values with and without selective braking by reduction of the brake force of the front brakes 28a and 28b. As illustrated in the example of FIG. 6C, the steering rack force may be reduced as all steering angles through selective braking. The maximum motor torque may be reduced by approximately 20% (e.g., from approximately 7.5 Newton-meters ("Nm") to 6.0 Nm), in some examples. By reducing the maximum motor torque, the size and the cost of the motor 72 may also be reduced.

It should be understood that the values illustrated in FIGS. 6B and 6C illustrate only one example set of values (e.g., one example set of steering angle values, one example set of rack force values, one example set of motor speed values, and one example set of motor torque values), and that these values may vary according to implementation.

Figure 7A:
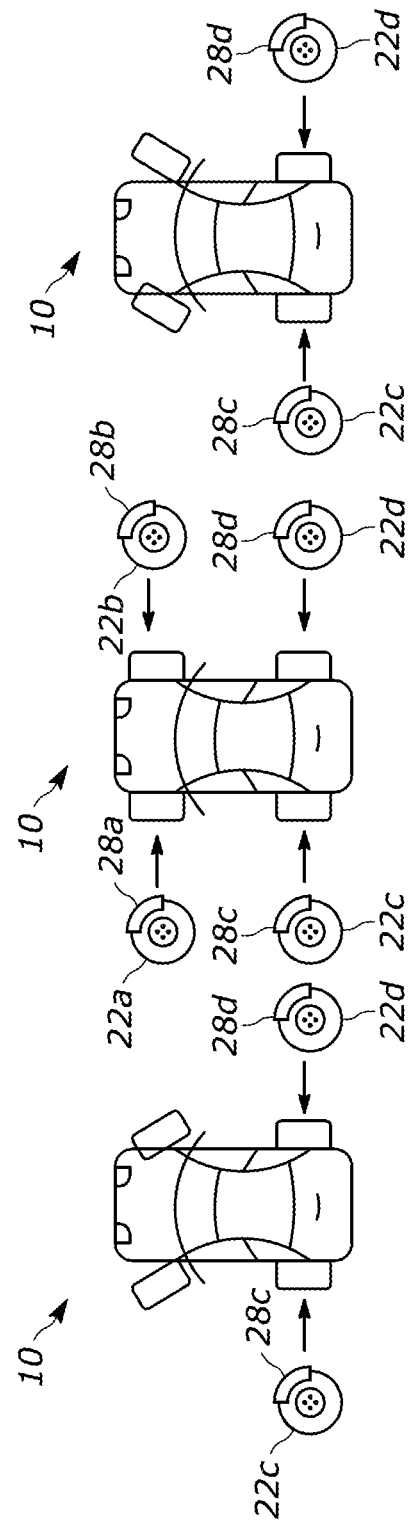
FIG. 7A illustrates a second example of selective braking depicted via vehicle graphics, according to some aspects.

Referring now to FIG. 7A, in some instances, the electronic processor 80 performs selective braking by blending out the brake force applied at the front brakes 28a and 28b relative to the steering angle of the vehicle 10. As illustrated in FIG. 7A, the amount of brake force applied to the front brakes 28a and 28b is inversely related to the steering angle of the vehicle 10. For example, the amount of brake force applied to the front brakes 28a and 28b may be inversely proportional to the steering angle of the vehicle 10.

Figure 7B:
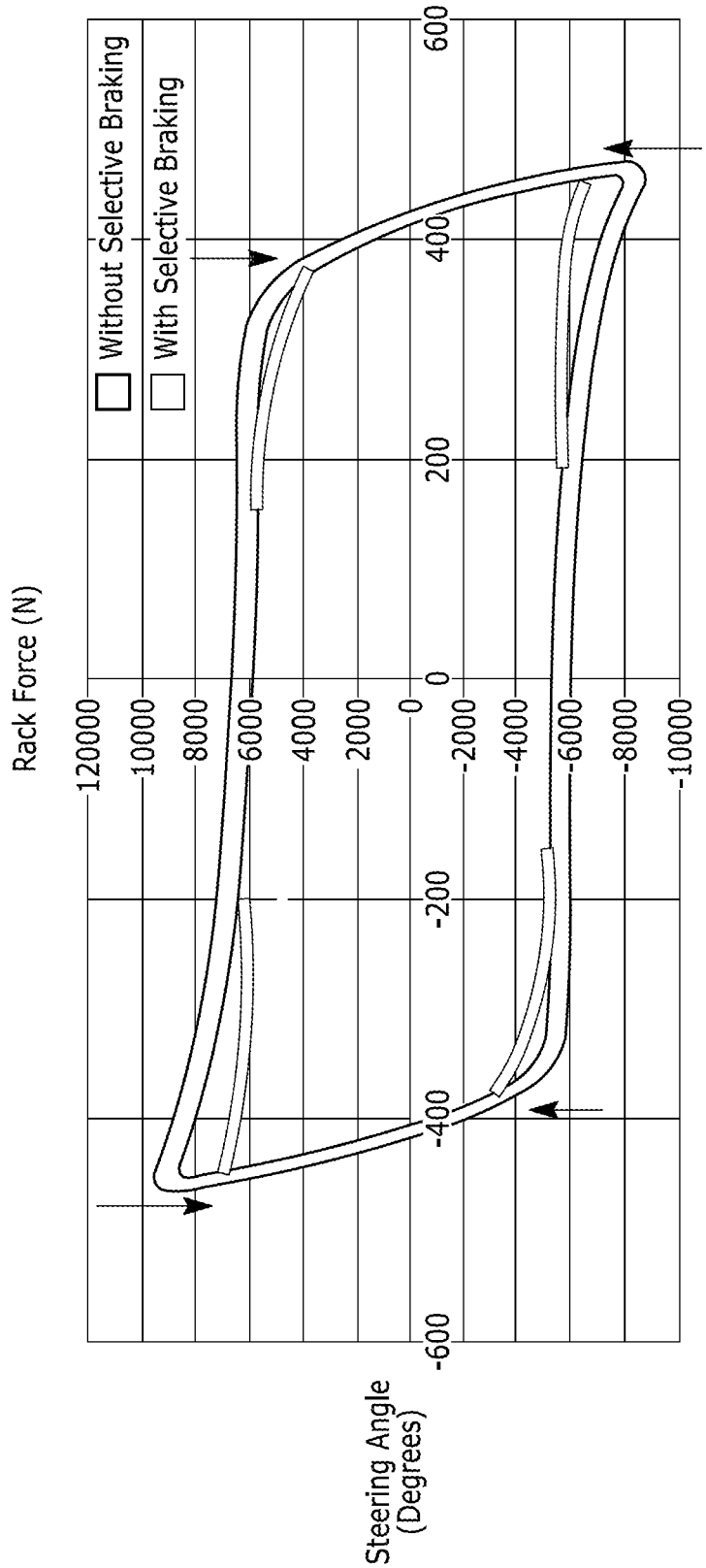
FIG. 7B illustrates a second example graph comparing the steering angle values with steering rack force values with and without selective braking, according to some aspects.

FIG. 7B illustrates an example graph comparing the steering angle values of the vehicle 10 with resulting steering rack force values with and without selective braking by brake force blending of the front brakes 28a and 28b. As illustrated in the example of FIG. 7B, the steering rack force may be reduced at high steering angles, through selective braking.

Figure 7C:
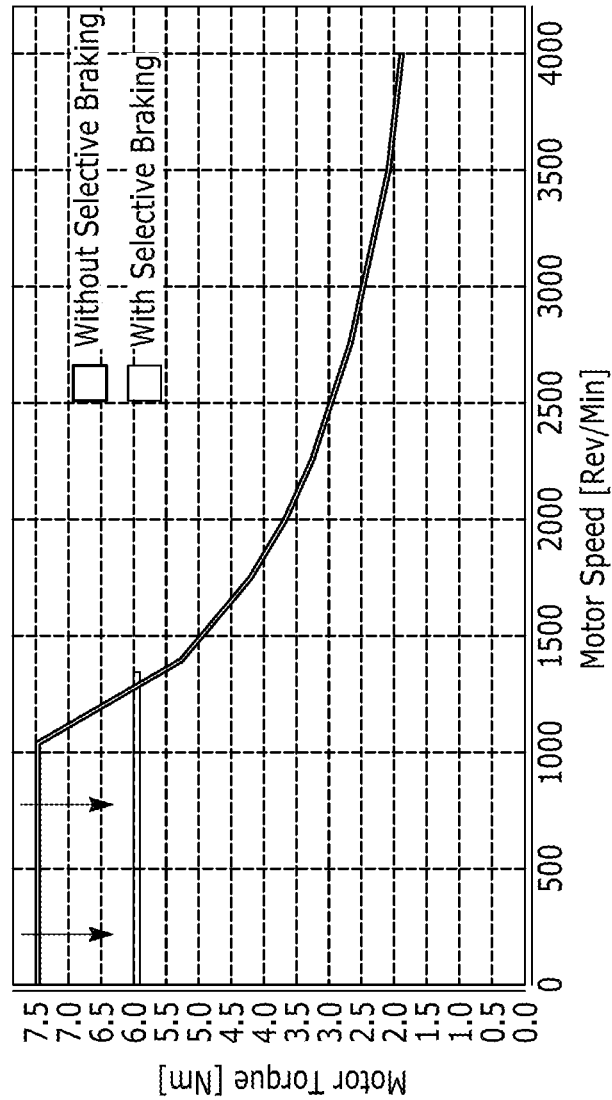
FIG. 7C illustrates a second example graph comparing motor speed values with corresponding motor torque values with and without selective braking, according to some aspects.

FIG. 7C illustrates an example graph comparing motor speed values in revolutions per minute of the motor 72 with corresponding motor torque values with and without selective braking by brake force blending of the front brakes 28a and 28b. As illustrated in the example of FIG. 7C, the steering rack force may be reduced at all steering angles through selective braking. The maximum motor torque may be reduced by approximately 20% (e.g., from approximately 7.5 Nm to 6.0 Nm), in some examples.

It should be understood that the values illustrated in FIGS. 7B and 7C illustrate only one example set of values (e.g., one example set of steering angle values, one example set of rack force values, one example set of motor speed values, and one example set of motor torque values), and that these values may vary according to implementation.

Figure 8A:
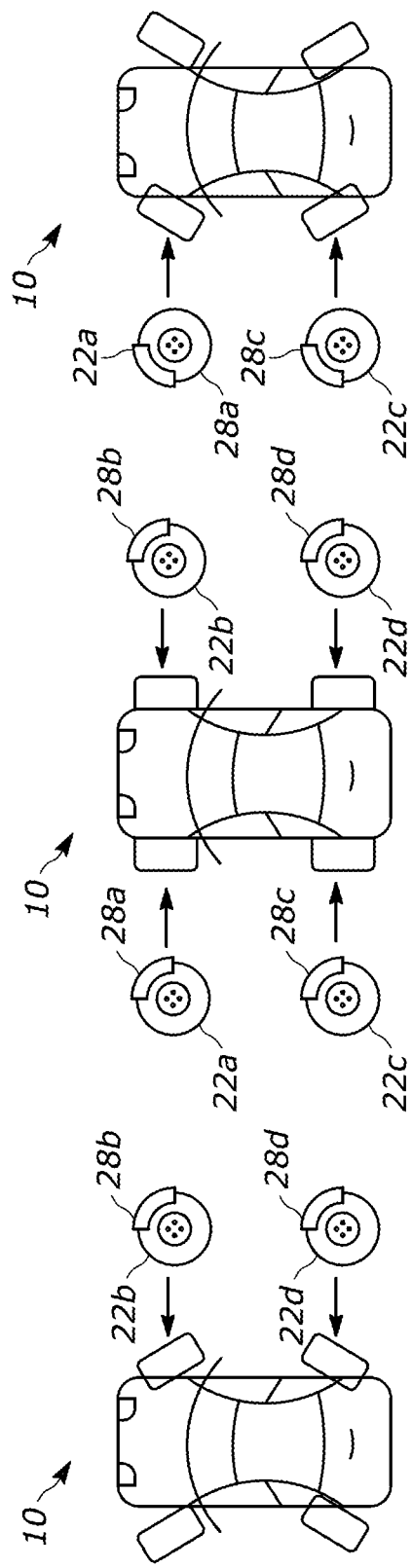
FIG. 8A illustrates a third example of selective braking depicted via vehicle graphics, according to some aspects.

Referring now to FIG. 8A, in some instances, the electronic processor 80 performs selective braking by reducing the brake force applied to the brakes corresponding to an inner curve of travel of the vehicle 10. As illustrated in FIG. 8A, in such instances, for a given axle of the vehicle 10 having a brake arranged on either side of the axle, the electronic processor 80 generates a command to apply brake force only to the brake opposite the steered direction of the vehicle 10. For example, when the vehicle 10 is steered to the left, the electronic processor 80 generates a command to apply brake force to a right brake (e.g., front right brake 28b and/or rear right brake 28d) and reduce brake force applied to a left brake (e.g., front left brake 28a and/or rear left brake 28c). Similarly, when the vehicle 10 is steered to the right, the electronic processor 80 generates a command to apply brake force to a left brake (e.g., front left brake 28a and/or rear left brake 28c) and reduce brake force applied to a right brake (e.g., front right brake 28b and/or rear right brake 28d). The given axle may be the front axle 14, the rear axle 18, or both. Therefore, the selective braking function may be adapted for a front-steer vehicle 10, a rear-steer vehicle 10, or a front and rear steer vehicle 10, and may reduce steering loads on the respectively steered axle. The amount of brake force applied to the brakes corresponding to an inner curve of travel of the vehicle 10 may be inversely related (e.g., inversely proportional) to the steering angle of the vehicle 10.

Figure 8B:
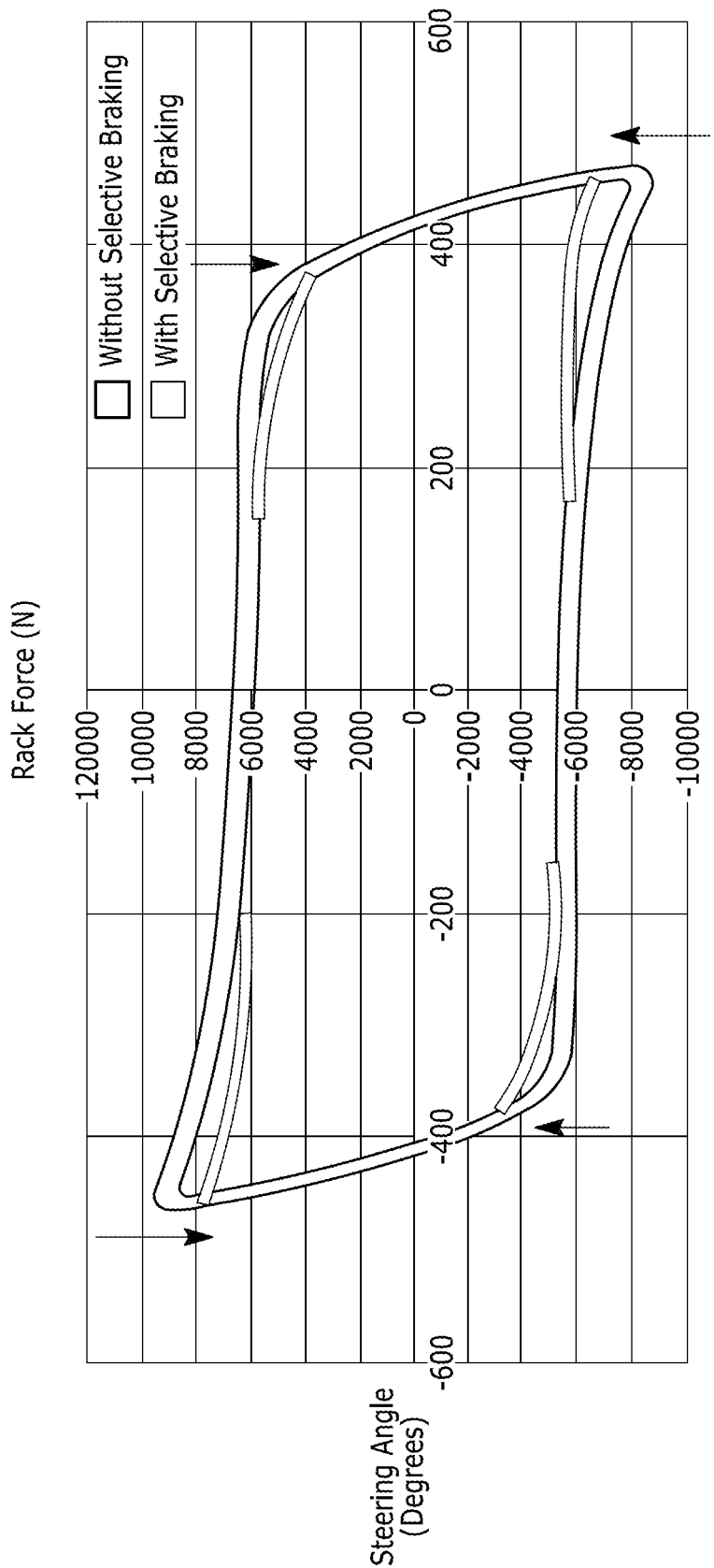
FIG. 8B illustrates a third example graph comparing the steering angle values with steering rack force values with and without selective braking, according to some aspects.

FIG. 8B illustrates an example graph comparing the steering angle values of the vehicle 10 with resulting steering rack force values with and without selective braking based on steered direction. As illustrated in the example of FIG. 8B, the steering rack force may be reduced at high steering angles through selective braking.

Figure 8C:
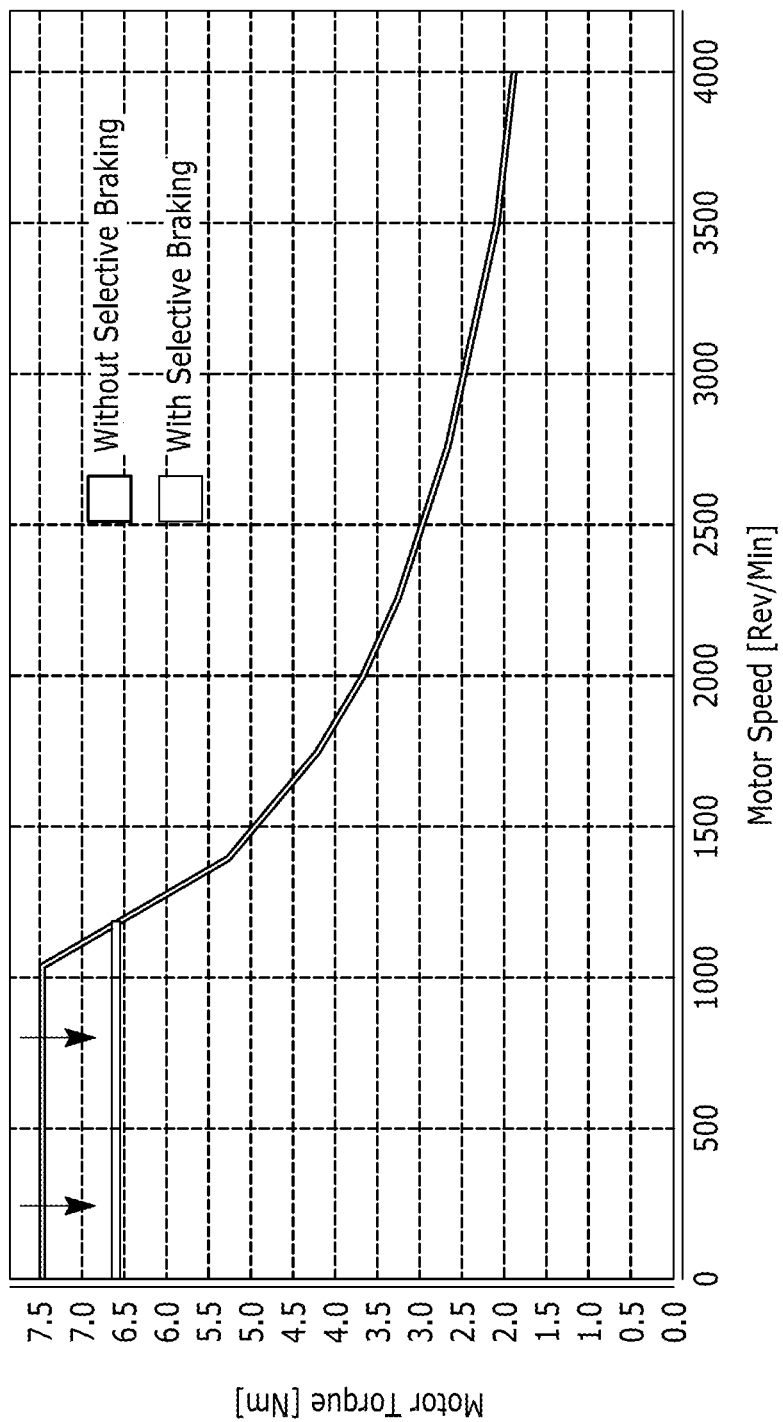
FIG. 8C illustrates a third example graph comparing motor speed values with corresponding motor torque values with and without selective braking, according to some aspects.

FIG. 8C illustrates an example graph comparing motor speed values in revolutions per minute of the motor 72 with corresponding motor torque values with and without selective braking by brake force blending of the front brakes 28a and 28b. As illustrated in the example of FIG. 8C, the steering rack force may be reduced at all steering angles through selective braking. The maximum motor torque may be reduced by approximately 13% (e.g., from approximately 7.5 Nm to 6.5 Nm), in some examples.

It should be understood that the values illustrated in FIGS. 8B and 8C illustrate only one example set of values (e.g., one example set of steering angle values, one example set of rack force values, one example set of motor speed values, and one example set of motor torque values), and that these values may vary according to implementation.

Figure 9:
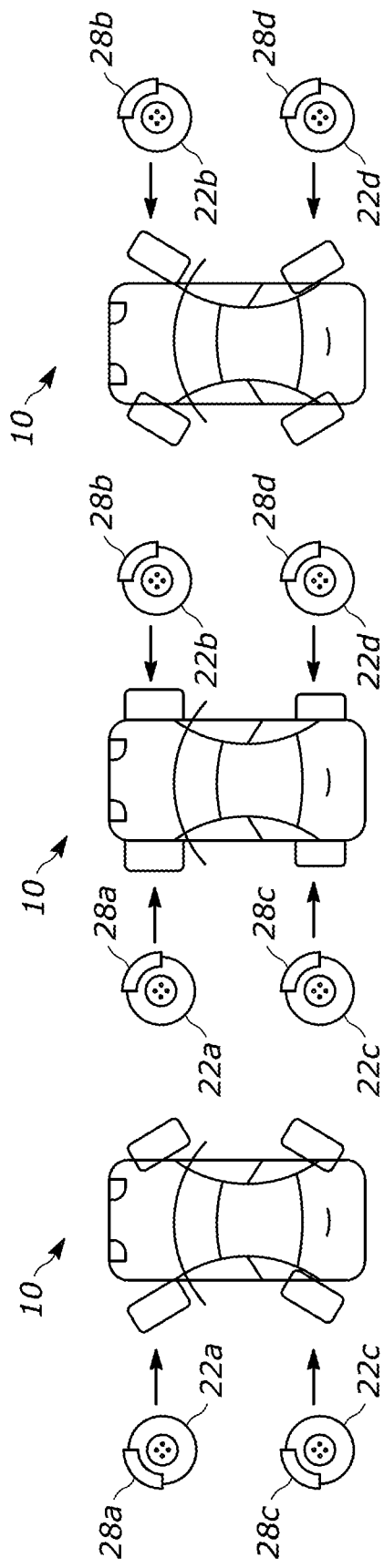
FIG. 9 illustrates a fourth example of selective braking depicted via vehicle graphics, according to some aspects.
Figure 10:
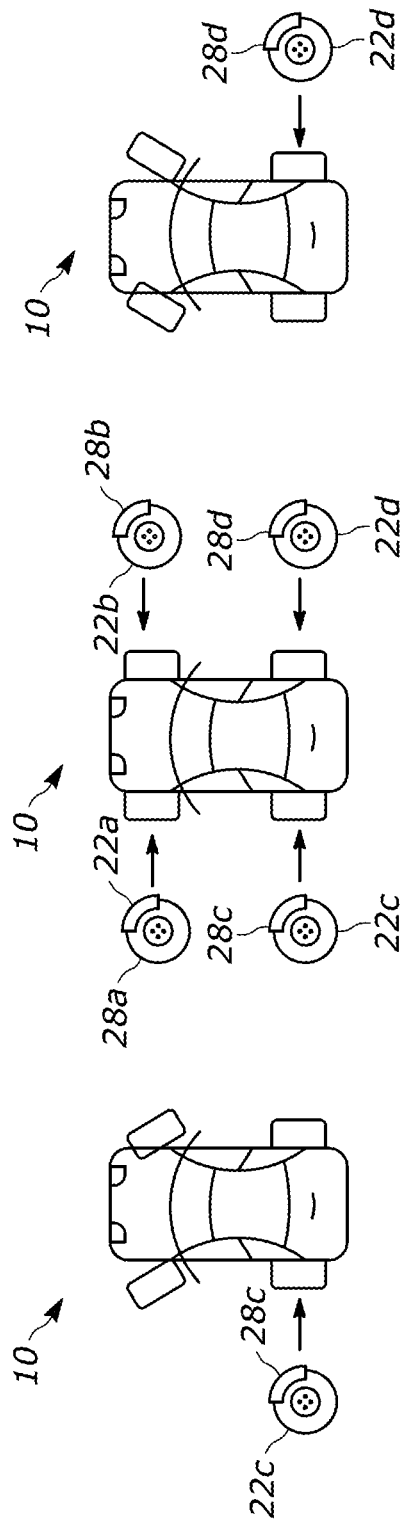
FIG. 10 illustrates a fifth example of selective braking depicted via vehicle graphics, according to some aspects.

Referring now to FIGS. 9 and 10, in some instances, the electronic processor 80 performs selective braking based on the suspension geometry of the vehicle 10. For example, in some instances, the electronic processor 80 generates a command to apply the brake force to only a single brake 28 of the vehicle 10 (e.g., as illustrated in FIG. 9), to brakes on an inner curve of the steered direction of the vehicle 10 (e.g., as illustrated in FIG. 10), or to three brakes 28 of the vehicle 10, in order to reduce loads on the steering assembly 34 while holding the position of the vehicle 10.

Figure 11:
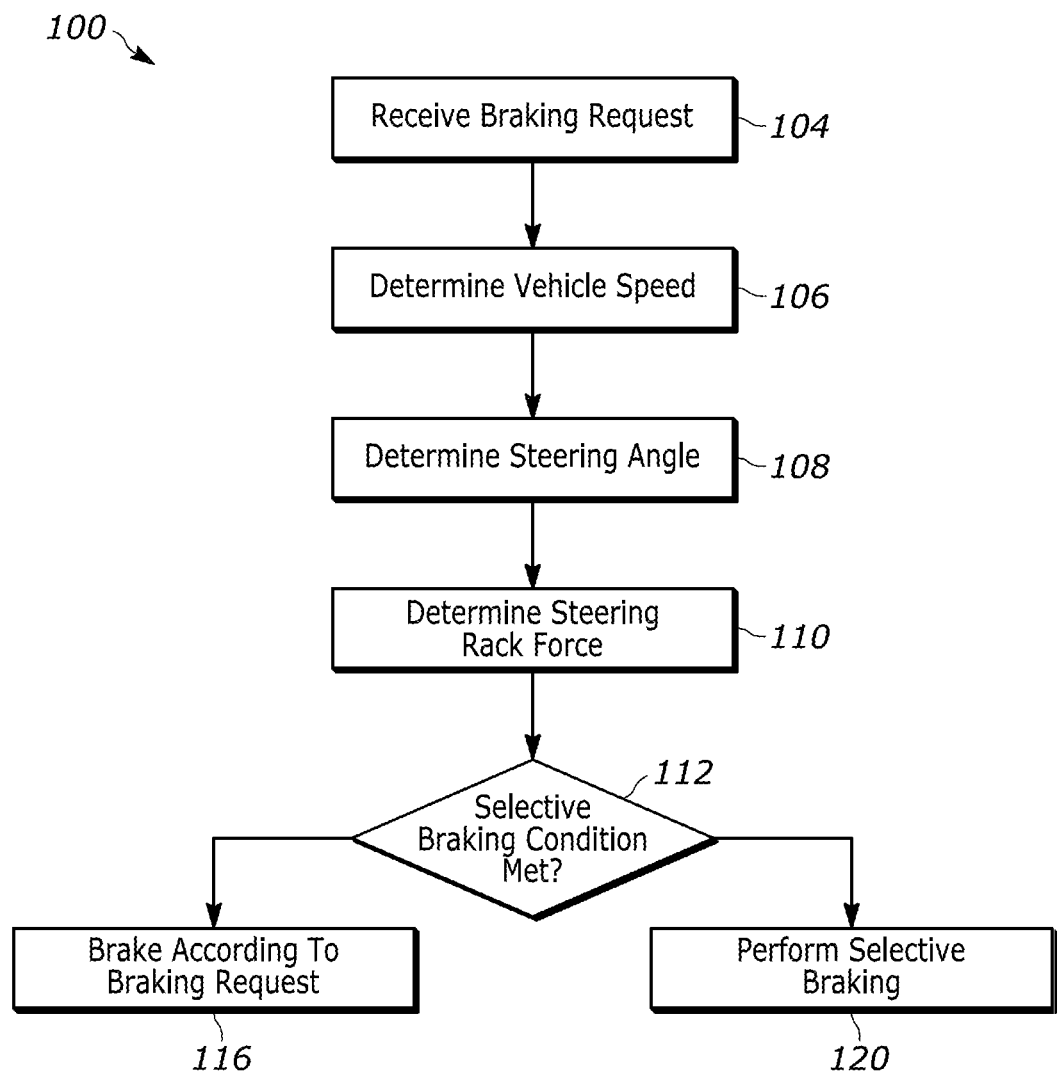
FIG. 11 illustrates a method for performing selective braking to reduce steering assembly loads, according to some aspects.

FIG. 11 illustrates a method 100, implemented by, for example, the electronic processor 80 in conjunction with other vehicle components, for selectively braking the vehicle 10 at or near standstill in order to reduce steering assembly loads. As described above, by reducing these loads, the overall wear on the steering assembly components, such as the tires, tie rods 46, and/or steering rack 40, may be reduced, and the size of vehicle components, such as the steering rack 40 and the EPS motor 72, may be reduced. As a result, overall cost of the vehicle components may be reduced.

The method 100 includes receiving, with the electronic processor 80, a braking request (at block 104). The braking request may be a signal generated in response to an application of force on the brake pedal 50 (e.g., in a brake by wire system), and may be indicative of a requested, or first, braking force to be applied to each of the brakes 28.

The method 100 includes determining a speed of the vehicle 10 (at block 106). The electronic processor 80 may determine the speed based on sensor data from the plurality of sensors 74 (e.g., sensor data from wheel speed sensors). The electronic processor 80 also determines a steering angle of the vehicle, for example, using a steering angle sensor included in the sensors 74 (at block 106). The electronic processor additionally determines a rack force of the steering rack 40 using, for example, the rack force estimator 90 and sensor data from the plurality sensors 74 (at block 110).

Using the determined vehicle speed, the steering angle, and rack force, the electronic processor 80 determines whether each condition in a set of selective braking conditions is met (at block 112). The set of selective braking conditions include a determination that the vehicle speed is less than a vehicle speed threshold and a determination that the rack force is greater than a rack force threshold. In some instances, the set of selective braking conditions further include a determination that the steering angle is greater than a steering angle threshold. In some instances, the electronic processor also determines a measured value (e.g., an acceleration) related to an incline of the vehicle 10, and the set of selective braking conditions also include a determination that the vehicle 10 is not at an incline (e.g., based on the measured value related to the incline being below a threshold value).

In some instances, the set of selective braking conditions include a determination that the vehicle is not slipping or moving in a given direction. For example, the electronic processor may determine, using the IMU 62, an acceleration of the vehicle, and determine that the vehicle is slipping or moving by determining that the acceleration is less than an acceleration threshold.

In response to determining that the set of selective braking conditions are not met (NO at block 112), the electronic processor 80 controls the brakes 28 according to the braking request. In contrast, in response to determining that the set of selective braking conditions are met (YES at block 112), the electronic processor 80 performs selective braking by controlling a first brake of the set of vehicle brakes 28 according to the first braking force and controlling a second brake of the set of vehicle brakes 28 according to a second braking force that is less than the first braking force (at block 120). In other words, the electronic processor 80 reduces or otherwise discards, with respect to the second brake, the amount of braking force indicated by the braking request for the respective second brake.

As described above with respect to FIGS. 6 and 7, in some instances, the first brake is a rear brake (e.g., rear left brake 28c and/or rear right brake 28d) of the vehicle 10, the second brake is a front brake (e.g., front left brake 28a and/or front right brake 28b) of the vehicle 10, and the second braking force is approximately zero Newtons.

As described above with reference to FIGS. 8 and 9, in some instances, the first brake is a rear brake (e.g., rear left brake 28c and/or rear right brake 28d) of the vehicle 10, the second brake is a front brake (e.g., front left brake 28a and/or front right brake 28b) of the vehicle 10, and the second braking force is inversely related to the steering angle of the vehicle 10.

As described above with reference to FIGS. 10 and 11, in some instances, the first brake and the second brake are arranged on the same axle of the vehicle 10, the second brake is arranged on a first side of the axle corresponding to a steered direction of the vehicle 10, and the first brake is arranged on a second side of axle opposite the first side. In such instances, the second braking force is inversely related to an absolute value of the steering angle of the vehicle 10.

Thus, aspects herein provide, among other things, systems and methods for selective braking to reduce steering loads.

What is claimed is:

1. A system for a vehicle, the system comprising:
a set of sensors;
an electronic processor in communication with the set of sensors and a set of vehicle brakes, the electronic processor configured to:
receive a braking request from a user via a brake pedal, the braking request indicative of a first braking force,
determine, using the set of sensors, a speed of the vehicle,
determine, using the set of sensors, a rack force of the vehicle,
determine, using the set of sensors, a steering angle of the vehicle,
determine whether a set of selective braking conditions are met, the set of selective braking conditions comprising a determination that the speed of the vehicle is less than a vehicle speed threshold, a determination that the rack force is greater than a rack force threshold, and a determination that the steering angle is greater than a steering angle threshold, in response to determining that the set of selective braking conditions are met, selectively control each brake included in the set of vehicle brakes by controlling a first brake included in the set of vehicle brakes according to the first braking force, and controlling a second brake included in the set of vehicle brakes according to a second braking force, the second braking force being less than the first braking force.

2. The system of claim 1, wherein the first brake is a rear brake of the vehicle, and the second brake is a front brake of the vehicle.

3. The system of claim 2, wherein the second braking force is zero braking force.

4. The system of claim 1, wherein the second braking force is inversely related to the steering angle of the vehicle.

5. The system of claim 1, wherein
the first brake and the second brake are arranged on the same axle of the vehicle,
the second brake is arranged on a first side of the axle, the first side corresponding to a steered direction of the vehicle, and
the first brake is arranged on a second side of axle opposite the first side.

6. The system of claim 5, wherein the second braking force is inversely related to an absolute value of the steering angle of the vehicle.

7. The system of claim 1, wherein
the electronic processor is further configured to determine, using the set of vehicle sensors, whether the vehicle is at an incline, and
the set of selective braking conditions further comprise a determination that the vehicle is not at an incline.

8. The system of claim 1, wherein
the set of sensors include an inertial measurement unit ("IMU"),
the electronic processor is configured to
determine, using the IMU, an acceleration of the vehicle, and
determine that the vehicle is not slipping by determining that the acceleration is less than an acceleration threshold, and
the set of selective braking conditions further comprise a determination that the vehicle is not slipping.

9. The system of claim 1, wherein the electronic processor is further configured to, in response to determining that the set of selective braking conditions are not met, control the set of vehicle brakes according to the braking request.

10. A method for controlling a vehicle including an electronic processor and a set of sensors, the method comprising:
receiving a braking request from a user via a brake pedal, the braking request indicative of a first braking force;
determining, using the set of sensors, a speed of the vehicle;
determining, using the set of sensors, a rack force of the vehicle;
determining, using the set of sensors, a steering angle of the vehicle;
determining whether a set of selective braking conditions are met, the set of selective braking conditions comprising a determination that the speed of the vehicle is less than a vehicle speed threshold, a determination that the rack force is greater than a rack force threshold, and a determination that the steering angle is greater than a steering angle threshold;
in response to determining that the set of selective braking conditions are met, selectively controlling each brake included in the set of vehicle brakes by
controlling a first brake included in the set of vehicle brakes according to the first braking force, and
controlling a second brake included in the set of vehicle brakes according to a second braking force, the second braking force being less than the first braking force.

11. The method of claim 10, wherein the first brake is a rear brake of the vehicle, and the second brake is a front brake of the vehicle.

12. The method of claim 11, wherein the second braking force is zero braking force.

13. The method of claim 10,
wherein the second braking force is inversely related to the steering angle of the vehicle.

14. The method of claim 10,
wherein the first brake and the second brake are arranged on the same axle of the vehicle,
the second brake is arranged on a first side of the axle, the first side corresponding to a steered direction of the vehicle, and
the first brake is arranged on a second side of axle opposite the first side.

15. The method of claim 14, wherein the second braking force is inversely related to an absolute value of the steering angle of the vehicle.

16. The method of claim 10, further comprising:
determining, using the set of vehicle sensors, whether the vehicle is at an incline,
wherein the set of selective braking conditions further comprise a determination that the vehicle is not at an incline.

17. The method of claim 10, further comprising:
determining, using an inertial measurement unit included in the set of sensors, an acceleration of the vehicle, and
determining that the vehicle is not slipping by determining that the acceleration is less than an acceleration threshold,
wherein the set of selective braking conditions further comprise a determination that the vehicle is not slipping.

18. The method of claim 10, further comprising:
in response to determining that the set of selective braking conditions are not met, controlling the set of vehicle brakes according to the braking request.

* * * * *